(12) United States Patent
Smith et al.

(10) Patent No.: US 11,604,350 B2
(45) Date of Patent: Mar. 14, 2023

(54) POLARIZATION MIRROR HMD WITH INCREASED BRIGHTNESS

(71) Applicant: SHARP KABUSHIKI KAISHA, Sakai (JP)

(72) Inventors: William Frederick Smith, Oxford (GB); David James Montgomery, Bampton (GB)

(73) Assignee: SHARP KABUSHIKI KAISHA, Sakai (JP)

( * ) Notice: Subject to any disclaimer, the term of this patent is extended or adjusted under 35 U.S.C. 154(b) by 476 days.

(21) Appl. No.: 16/804,503

(22) Filed: Feb. 28, 2020

(65) Prior Publication Data

US 2021/0271082 A1 Sep. 2, 2021

(51) Int. Cl.
*G02B 27/01* (2006.01)
*G02B 5/30* (2006.01)
*G02F 1/137* (2006.01)

(52) U.S. Cl.
CPC ........ *G02B 27/0172* (2013.01); *G02B 5/3033* (2013.01); *G02B 5/3083* (2013.01); *G02F 1/137* (2013.01)

(58) Field of Classification Search
CPC .............. G02B 27/0172; G02B 27/01; G02B 27/0101; G02B 27/017; G02B 2027/0118–0121; G02B 2027/0161; G02B 2027/0194; G02B 5/3033; G02B 5/3083; G02B 5/3025; G02B 5/3058; G02F 1/137
See application file for complete search history.

(56) References Cited

U.S. PATENT DOCUMENTS

| | | | |
|---|---|---|---|
| 6,271,969 B1 | 8/2001 | Mertz | |
| 11,022,784 B1* | 6/2021 | Wheelwright | ....... G02B 27/286 |
| 2015/0370074 A1 | 12/2015 | McDowall et al. | |
| 2018/0239149 A1 | 8/2018 | Yun et al. | |
| 2019/0235235 A1 | 8/2019 | Ouderkirk et al. | |
| 2019/0243147 A1 | 8/2019 | Smithwick et al. | |
| 2021/0333456 A1* | 10/2021 | Ishioka | ............ H01L 27/14629 |

FOREIGN PATENT DOCUMENTS

WO 2016/003746 A1 1/2016
WO 2018/178817 A2 10/2018

\* cited by examiner

*Primary Examiner* — Stephone B Allen
*Assistant Examiner* — Adam W Booher
(74) *Attorney, Agent, or Firm* — ScienBiziP, P.C.

(57) ABSTRACT

An optical system and, specifically an HMD, is disclosed for increasing brightness efficiency of light transmitted from a display. By including one polarization selective mirror between a half mirror and a display and another polarization selective mirror between the half mirror and a lens, brightness efficiency is increased without a substantial increase in thickness.

18 Claims, 11 Drawing Sheets

POLARIZATION MIRROR HMD WITH INCREASED BRIGHTNESS

FIELD

The present disclosure has application within the field of wearable displays, in particular, Head-Mounted-Displays (HMDs).

BACKGROUND

Conventional computer graphics technology has progressed significantly since the first video games were developed. Relatively inexpensive three-dimensional (3D) graphics can now be produced with nearly photo-realistic interactive virtual environments. Virtual reality (VR) involves generating images, sounds, etc. that simulate a user's presence in a virtual environment, typically using specialized equipment such as VR headsets. In contrast, augmented reality (AR) involves superimposing computer-generated imagery on a user's view of the real-world environment.

U.S. Pat. No. 6,271,969B1 (Agilent Technologies) describes a system that uses a curved reflective surface to collimate light from a display with a compact set of optics.

U.S. Patent Application Publication No. US 2015/0370074A1 (Fakespace Labs) describes a transparent screen situated between a user and a curved mirror.

U.S. Patent Application Publication No. US 2019/0243147A1 (Disney enterprises) describes a system that uses an unspecified optic to reflect one chirality of circularly polarized light.

U.S. Patent Application Publication No. US 2019/0235235A1 (3M) describes a reflective polarizer that is curved about two axes.

U.S. Patent Application Publication No. US 2018/0239149A1 (3M) describes multiple refracting optics and up to two curved reflective surfaces per system.

Figure 1:
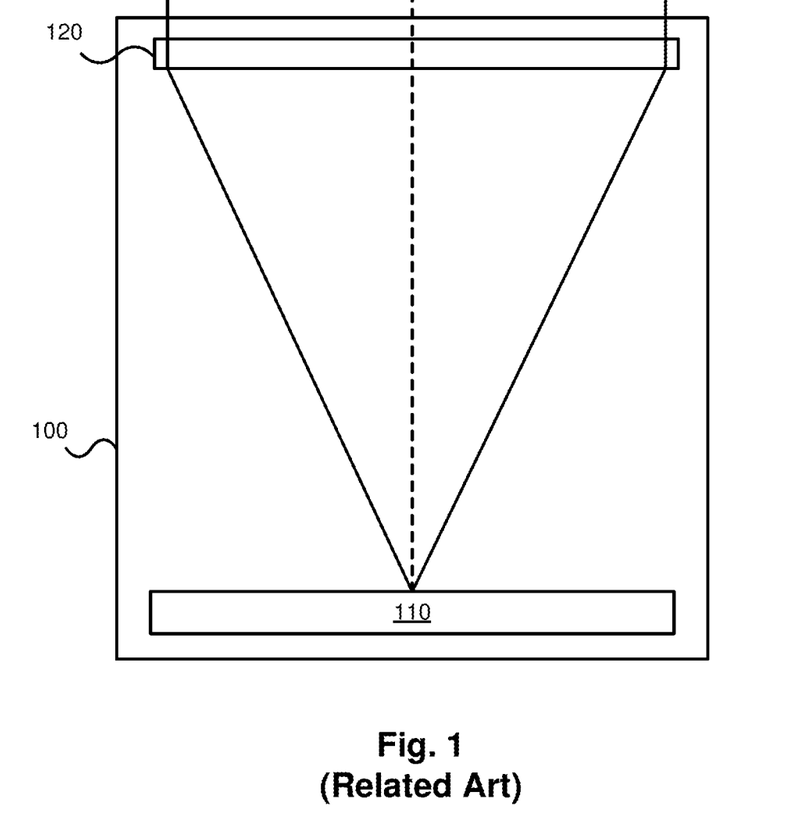
FIG. 1 illustrates a simple magnifier in accordance with the present disclosure.

Conventional VR/AR HMDs, as well as other types of displays such as those of flight simulators, can require a wide field of view and high resolution with a large eyebox. FIG. 1 illustrates a simple magnifier that is one conventional approach for producing a wide field of view, high-resolution display with a large eyebox. As shown in FIG. 1, a display device 100 with a simple magnifier typically includes a display 110 disposed at a focal plane of a lens element 120 that collimates light emitted by the display 110, thereby producing displayed imagery appear to be "at infinity" or very far away. A longer the focal length of the lens element 120 produces a proportionately larger eyebox and allows easier eye alignment. However, a display device with such a lens is also longer and larger and can be undesirable. For example, the length and size of an HMD with a simple magnifier creates a moment that pulls the head-mounted display downward, which is uncomfortable for the wearer and can create eye alignment problems. Although the moment may be counter balanced, adding a counterbalance also adds weight to the HMD and decreases comfort for a user's head.

One way to reduce distance between the optics and the display is to use a "Pancake Window" as first described by the Farrand Optical Company. Pancake windows are also known as pancake lenses, polarization folded optics and coaxial catadioptric systems.

In their simplest form, pancake lenses have light travelling a distance from the display before the light is reflected back towards the display. The light is then reflected again immediately in front of the display before passing through the original reflective optic, then passing through the lens and into a user's eye.

Using reflective polarization selective films, such as 3M's DBEF, and retardation films allow control over whether light is reflected or transmitted. These two reflections have the effect of folding the optical paths and reducing the distance between the lens and the screen to one third of its original value.

A pancake lens system with flat reflectors greatly reduces system size without affecting the unfolded focal length of the optics or the image quality. System size can be further reduced by a reduction in the focal length. However, increasing the curvature or refractive index of refractive elements beyond conventional systems achieves a small focal length reduction but also greatly degrades image quality. Therefore, there is limited scope for this approach.

The reflective surfaces may be curved to add focusing power. This yields a system that has reflection (catoptric) and refraction (dioptric) and is, therefore, considered catadioptric. As with catadioptric camera lenses, there can be a great reduction in length and the combined optical stack and air gap can measure less than 15 mm (i.e., $10^{-3}$ meters).

Figure 2:
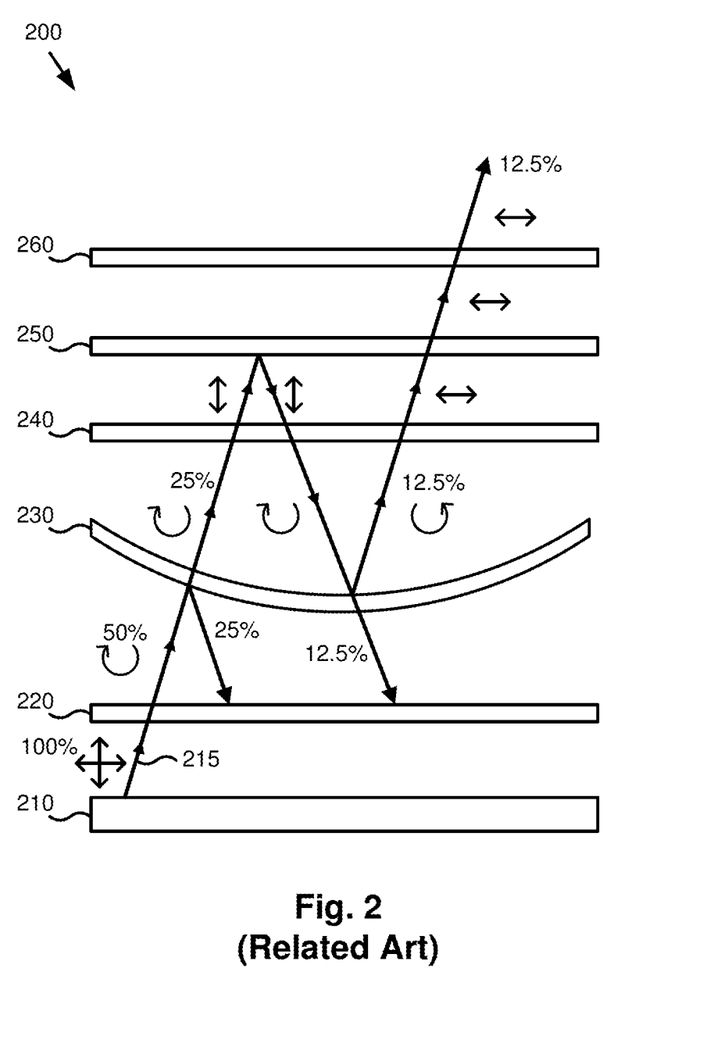
FIG. 2 illustrates a display device with related art "pancake" optics.

FIG. 2 illustrates a conventional display device 200 with modified pancake optics. The display device 200 includes a display 210 and an arrangement of optical elements including a circular polarizer element 220, a concave 50-50 (half-silvered) beam-splitter element 230, a quarter-wave plate element 240, a flat polarization-selective mirror element 250, and a linear polarizer element 260. The linearly polarized light 215 enters the optical arrangement and leaves the optical arrangement as linearly polarized light.

The optical arrangement avoids the need for a curved polarization selective mirror element, which is replaced with the concave 50/50 beam-splitter (half-silvered) mirror element 230. At the same time, a flat half-silvered beam-splitter element of other conventional designs is replaced with the flat polarization-selective mirror element 250 with the pancake optical arrangement relatively easier to manufacture since the flat polarization-selective mirror element 250 does not need to be molded into a compound shape and half-silvering the collimating curved mirror can easily be achieved using metal deposition.

Since polarization selective optics are used, the pancake optical arrangement is also brighter than other conventional pancake optical arrangement using, only half-silvered Mirrors for both the curved mirror and the final flat beam splitter. Furthermore, the pancake optical arrangement reduces the depth of the unfolded optical arrangement of other conventional display devices and larger fields of view may be relatively easier to achieve using the mirror element 250 than with a Fresnel lens of other conventional optical arrangements.

In the pancake optical arrangement, the circular polarizer element 220, the concave 50-50 (half-silvered) beam-splitter element 230, the quarter-wave plate element 240, the flat polarization-selective mirror element 250, and the linear polarizer element 260 may each be achromatic and the circular polarizer element 220 and the quarter-wave plate element 240 may further be AR-coated. An AR coating of the circular polarizer element 220 and the quarter-wave plate element 240 prevents stray reflections so that the only reflections are at the mirrors (the polarization-selective mirror element 250 and the 50-50 (half-silvered) beam-splitter element 230 in the display device 200). For example, light passing back through the 50-50 (half-silvered) beam-splitter element 230 should not reflect off the circular polarizer's surface (leading to stray reflections back through the system) but rather be absorbed by the circular polarizer element 220 (which may include a stacked quarter wave plate and a linear polarizer).

As shown in FIG. 2, light emitted by the display 210 passes through the circular polarizer element 220 and is circularly polarized. The circularly polarized light then passes through the half-silvered curved beam splitter element 230, with half of the light being reflected back as left-handed polarized light that is absorbed by the circular polarizer element 220.

The circularly polarized light transmitted by the circular polarizer element 220 then passes through the quarter-wave plate element 240, which linearly polarizes the light and outputs vertically polarized light. The vertically polarized light reflects off the flat polarization selective mirror element 250, which is oriented to reflect such vertically polarized light and transmit horizontally polarized light.

The reflected vertically polarized light again passes through the quarter-wave plate element 240 and is left circularly polarized. The left circularly polarized light is then incident on the half-silvered curved beam splitter element 230, which reflects half of the light again, with the reflected light being right circularly polarized and collimated (with the folded path length being equal to the focal length of the half-silvered curved beam-splitter mirror element 230).

The right circularly polarized light reflected from the half-silvered curved beam splitter element 230 passes through the quarter-wave plate element 240, which linearly polarizes the light as horizontally polarized light. The horizontally polarized light passes through the flat polarization selective mirror element 250, and then through the horizontal linear polarizer element 260 before exiting the display device 200.

Unfortunately, most conventional pancake lenses have poor efficiency, with at most 25% of the light passing through the optics due to the use of a half mirror, which leads to losses of 50% when light is first transmitted through it, and then further losses of 50% when light is subsequently reflected from it. Although low, this efficiency is a large improvement over the original 1978 design, primarily due to low cost polarization selective mirror films.

The light produced by conventional pancake optics devices such as the display device 200 tends to be very dim. With reference to FIG. 2, each time the folded light interacts with the concave 50-50 (half-silvered) beam-splitter element 230 and the flat polarization-selective mirror element 250, one-half the light is discarded by the corresponding beam splitter. As light passing through the optical arrangement of FIG. 2 interacts with the circular polarizer element 220 once and the concave 50-50 (half-silvered) beam-splitter element 230 and flat polarization-selective mirror element 250 a total of four times, only $\frac{1}{16}$ of the light initially emitted by the display 210 ultimately exits the display device 200.

However, increases in brightness efficiency have stalled and existing designs reach about 20% efficiency. Fakespace Labs in US 2015/0370074A1 describes a pancake lens with near 100% efficiency. However, an unspecified optical element is required that reflects one handedness of circularly polarized light and also flips the handedness. An optical element satisfying this requirement does not appear to be currently commercially available or used in any pancake lens products.

The brightness efficiency of existing designs may be addressed directly by using a brighter display or a narrower emission profile. However, a brighter display results in a device that is uncomfortably hot and a narrower emission profile results in a device having a small eyebox. Instead it would be desirable to use an optical train with a higher efficiency than a pancake lens but with a thickness that is still less than the focal length of a conventional lens.

Figure 3:
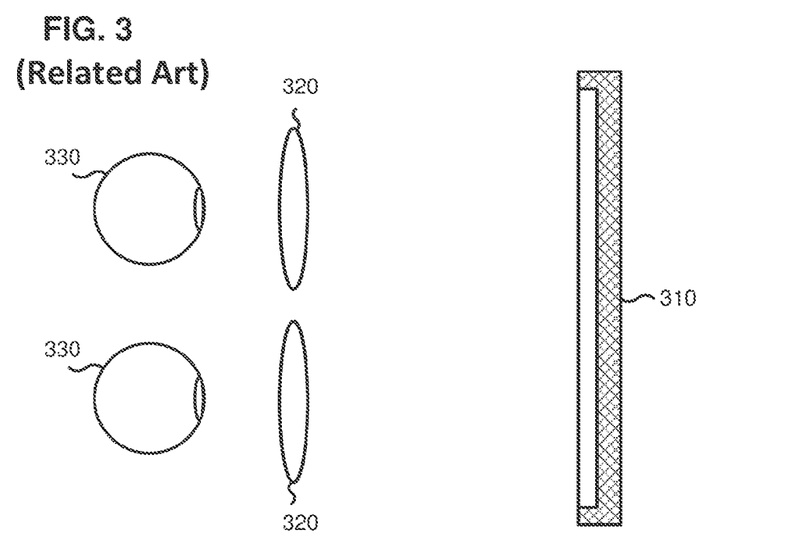
FIG. 3 illustrates a related art design for an HMD.

FIG. 3 illustrates a related art design for an HMD. As shown in FIG. 3, the HMD includes a single shared display 310 and one lens 320 for each eye 330. Alternatives to the related art HMD design include using multiple lenses for each eye or a screen for each eye. Conventional systems typically stay within this narrow range of design.

Figure 4:
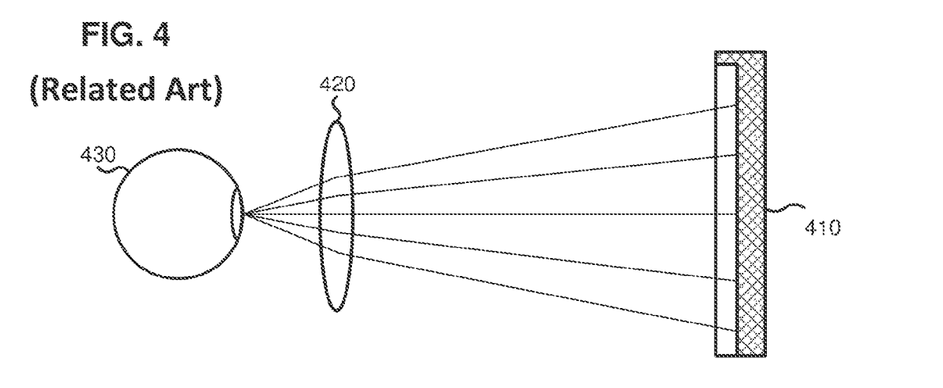
FIG. 4 illustrates a related art design for an HMD for one eye.

FIG. 4 illustrates a related art design for an HMD for one eye. As shown in FIG. 4, the HMD includes a single shared display 410 and one lens 420 for each eye 430. FIG. 4 further shows that there may be a large amount of air space between the display 430 and the lens 420 with the display 410 far from a user's eye 430 and creating an uncomfortable weight distribution.

Figure 5:
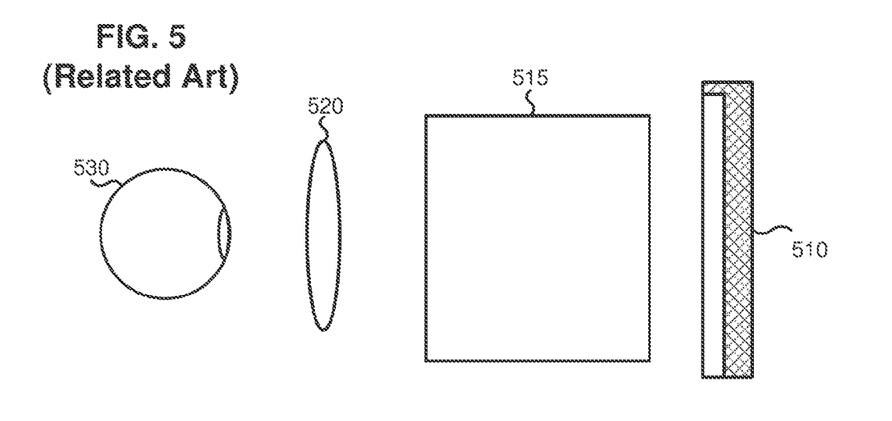
FIG. 5 illustrates a related art simple pancake lens design.

FIG. 5 illustrates a simple related art pancake lens design. As shown in FIG. 5, the HMD includes a display 510, an optical arrangement 515 and a refracting lens 520 for each eye 530 between the display 510 and the lens 520. The optical arrangement includes optical elements that change the light from linear polarization to circular polarization and back, thereby allowing control of when the light is transmitted and creating a folded optical path section in which the optical path is folded. The folding reduces the thickness of the folded optical path section to one third of its original value. Due to the optical arrangement, the related art pancake lens design in FIG. 5 has an efficiency of only 25%.

Therefore, there is a need for a system that addresses the low brightness efficiency of conventional pancake lens designs for use in HMDs.

CITATION LIST

U.S. Pat. No. 6,271,969 B1 (Mertz, Pierre H., published Aug. 7, 2001).
U.S. Pat. App. Pub. No. US 2015/0370074 A1 (McDowall, et al., published Dec. 24, 2015).
U.S. Pat. App. Pub. No. US 2018/0239149 A1 (Yun et al., published Aug. 23, 2019).
U.S. Pat. App. Pub. No. US 2019/0243147 A1 (Smithwick et al., published Aug. 8, 2019).
U.S. Pat. App. Pub. No. US 2019/0235235 A1 (Ouderkirk et al., published Aug. 1, 2019).
International Pat. App. Pub. No. WO 2016/003746 A1 (Kollin et al., published Jan. 7, 2016).
International Pat. App. Pub. No. WO 2018/178817 A2 (Steiner et al., published Oct. 4, 2018).

SUMMARY

Features and advantages of the disclosure will be set forth in the disclosure which follows, and, in part, will be apparent from the description or may be learned by practice. The objectives and other advantages of the disclosure will be realized and attained by the structure particularly pointed out in the written description and claims hereof as well as the appended drawings.

The present disclosure describes an optical system and, specifically an HMD, for increasing brightness efficiency without a corresponding increase in thickness that would result in user discomfort. In accordance to the implementations of the present disclosure, a novel display apparatus is disclosed that includes two polarization sensitive mirrors between the half mirror and the display to achieve increased brightness efficiency over conventional designs with only a relatively small increase in thickness and without undesirable discomfort to a user.

In one aspect of the present disclosure, a head mounted display is provided that includes a display medium having a plurality of pixels and configured to emit light from at least one of the plurality of pixels. In an example implementation, an optical arrangement provides at least two light paths for the emitted light with the optical arrangement including a first polarization selective mirror configured to transmit a first polarization component of the emitted light and a second polarization selective mirror configured to transmit a second polarization component of the emitted light with a partial mirror between the first polarization selective mirror and the second polarization selective mirror. The optical arrangement may further include a half mirror between the first linear polarization selective mirror and the second linear polarization selective mirror, a first quarter wave plate between the first linear polarization selective mirror and the partial mirror and a second quarter wave plate between the partial mirror and the second linear polarization selective mirror.

In other example implementations, a lens is provided with the optical arrangement between the display medium and the lens or at least one of the first polarization selective mirror, the second polarization selective mirror, and the partial mirror is either integrated in the lens or adhered to a surface of the lens. A first retarder film may be included between the first polarization selective mirror and the partial mirror and a second retarder film may be included between the partial mirror and the second polarization selective mirror. The partial mirror may be a half mirror, the first retarder film may be a first quarter wave plate and the second retarder film may be a second quarter wave plate. The first retarder film and the second retarder film may be arranged symmetrically with respect to the partial mirror.

In other example implementations, the first polarization selective mirror and the second polarization selective mirror are arranged symmetrically with respect to the partial mirror. In other example implementations, the first polarization component is orthogonal to the second polarization component. In other example implementations, the at least two light paths are substantially collinear when exiting the optical arrangement. In other example implementations, the emitted light is linearly polarized having the first polarization component.

In other example implementations, the first polarization selective mirror and the second polarization selective mirror are each curved such that the at least two light paths are substantially collinear when exiting the optical arrangement. A refracting medium may be provided that supports the optical arrangement such that different wavelengths of the emitted light are not laterally separated.

Additional features and advantages of the disclosure will be set forth in the description which follows, and in part will be apparent from the description, or may be learned by practice of the disclosure. It is to be understood that both the foregoing general description and the following detailed description of the present disclosure are example and explanatory and are intended to provide further explanation of the disclosure as claimed.

These and other implementations will also become readily apparent to those skilled in the art from the following detailed description of the implementations having reference to the attached figures, the disclosure not being limited to any particular implementations disclosed.

BRIEF DESCRIPTION OF THE DRAWINGS

The accompanying drawings, which are included to provide a further understanding of the disclosure and are incorporated in and constitute a part of this specification, illustrate implementations of the disclosure and explain the principles of the disclosure. Features, elements, and aspects of the disclosure that are referenced by the same numerals in different figures represent the same, equivalent, or similar features, elements, or aspects in accordance with one or more implementations.

DESCRIPTION

The present disclosure is directed to an HMD device for providing information to a user. Although the present disclosure is illustrated with respect to an HMD device, it is contemplated that the present disclosure may be utilized anytime it is desired to provide information to a user via an optical device.

Reference will now be made in detail to the preferred implementations of the present disclosure, examples of which are illustrated in the accompanying drawings.

In a conventional pancake lens device, ignoring retarder films and lenses, the path taken by a ray leaving a display is in the order of emission from the display, transmission through a half mirror, reflection from a polarization sensitive mirror, reflection from a half mirror, transmission through a polarization sensitive mirror, and absorption in a user's retina. The transmission through the half mirror also leads to a reflection of one-half the light.

By including two polarization sensitive mirrors with one between the half mirror and the display and one between the half mirror and the lens, implementations of the present disclosure allow recovery of light with one-half of the recovered light sent through the half mirror. The present disclosure provides two optical paths each having an equal and complimentary contribution up to 25% in order to achieve a total brightness efficiency of as much as 50%. Therefore, the implementations of the present disclosure can achieve twice the brightness efficiency of conventional pancake lens designs with only a relatively small increase in thickness and without undesirable discomfort to a user.

Figure 6A:
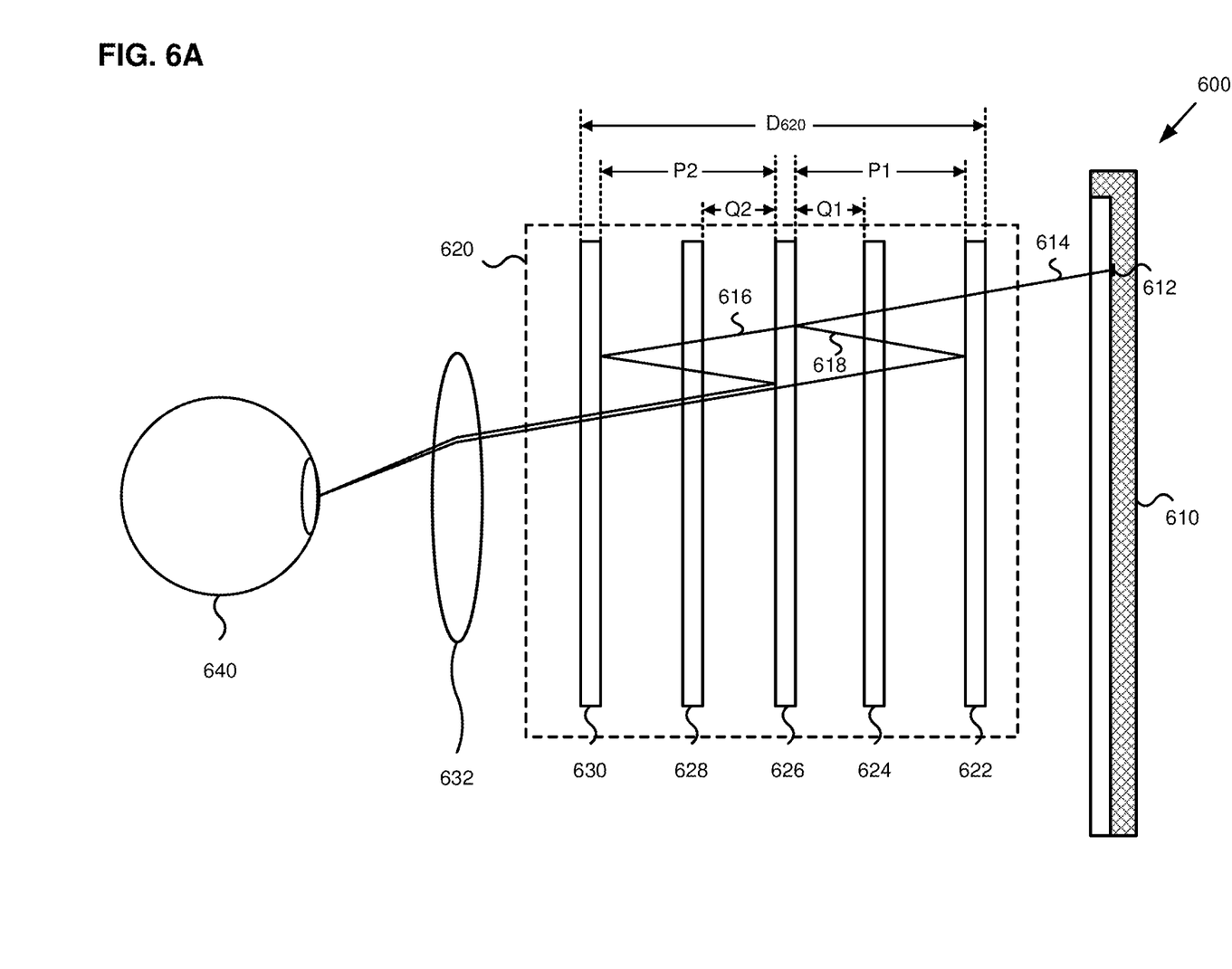
FIG. 6A illustrates a novel optical arrangement having high-efficiency pancake optics for an HMD in accordance with an example implementation of the present disclosure.

FIG. 6A illustrates a novel optical arrangement having high-efficiency pancake optics for an HMD in accordance with an example implementation of the present disclosure. As shown in FIG. 6A, an HMD 600 includes a display medium 610 and an optical arrangement 620 that is configured to provide at least two light paths for light emitted from each of a plurality of pixels of the display medium 610. In the present implementation, the HMD 600 also includes a lens 632 to collimate the light from the optical arrangement 620 before reaching a user's eye 640.

The display medium 610 may be any type of display capable of generating imagery, such as a liquid crystal display (LCD), an organic light emitting diode (OLED) display, etc. In the case of the display medium 610 being an LCD, light emitted by the display medium 610 is linearly polarized. In the case of the display medium 610 being an OLED, light emitted by the display medium 610 may not be linearly polarized. A linear polarizer element may be needed if the light from the display medium 610 is not linearly polarized.

The optical arrangement 620 includes a first polarization selective mirror 622, a first retarder film 624 (e.g., a quarter-wave plate), a half mirror 626, a second retarder film 628 (e.g., a quarter-wave plate), and a second polarization selective mirror 630. In the present implementation, the first polarization selective mirror 622 and the second polarization selective mirror 630 are disposed symmetrically on opposite sides of the half mirror 626.

As shown in FIG. 6A, the distance (P1) between the first polarization selective mirror 622 and the half mirror 626 is equal to the distance (P2) between the second polarization selective mirror 630 and the half mirror 626. Also, the first retarder film 624 and the second retarder film 628 may be disposed symmetrically on opposite sides of the half mirror 626. However, the first retarder film 624 and the second retarder film 628 need not be disposed symmetrically and may be disposed asymmetrically. As shown in FIG. 6A, the distance (Q1) between the first retarder film 624 and the half mirror 626 is equal to the distance (Q2) between the second retarder film 628 and the half mirror 626. In the present implementation, the distance $D_{620}$ between the two polarization selective mirrors 622 and 630 may be ⅔ of that of the typical lens to display distance in a conventional system. In one implementation, the distance $D_{620}$ between the two polarization selective mirrors 622 and 630 may be 25-30 mm. In other implementations, the distance $D_{620}$ between the two polarization selective mirrors 622 and 630 may be greater or smaller than 25-30 mm.

As shown in FIG. 6A, the display medium 610 may include a plurality of pixels configured to emit light and collectively generating imagery. For example, a pixel 612 of the display medium 610 may emit light 614. As the emitted light 614 travels through the optical arrangement 620, two light paths are created as half of the light 614 passes through the half mirror 626 and the other half of the light 614 is reflected by the half mirror 626. The two light paths 616 and 618 are substantially collinear when exiting the optical arrangement 620. In FIG. 6A, there are two folded path sections, one related to each of the first polarization selective mirror 622 and second polarization selective mirror 630. It should be noted that, in FIG. 6A, the light paths 616 and 618 are shown slightly separated only for clarity but would not actually be separated after passing through the half mirror 626.

In some implementations of the present application, refracting elements may be placed between two other elements or may enclose two or more other elements. In some implementations of the present application, any of the first polarization selective mirror 622, the second polarization selective mirror 630, the first retarder film 624 and the second retarder film 628 may be adhered to or formed on a curved or flat surface of a refracting element.

In some implementations of the present application, the first polarization selective mirror 622 may include the integral first retarder film 624 and the second polarization selective mirror 630 may include the integral second retarder film 628. In some implementations of the present application, the transmission axis of the second polarization selective mirror 630 may be orthogonal or parallel to the transmission axis of the first polarization selective mirror 622. However, it is preferred that the transmission axes be orthogonal. If, instead, the transmission axis of the first polarization selective mirror 622 and the transmission axis of the second polarization selective mirror 630 are parallel, the first retarder film 624 and the second retarder film 628 have parallel fast axes so as to both add to the rotation of polarization.

Figure 6B:
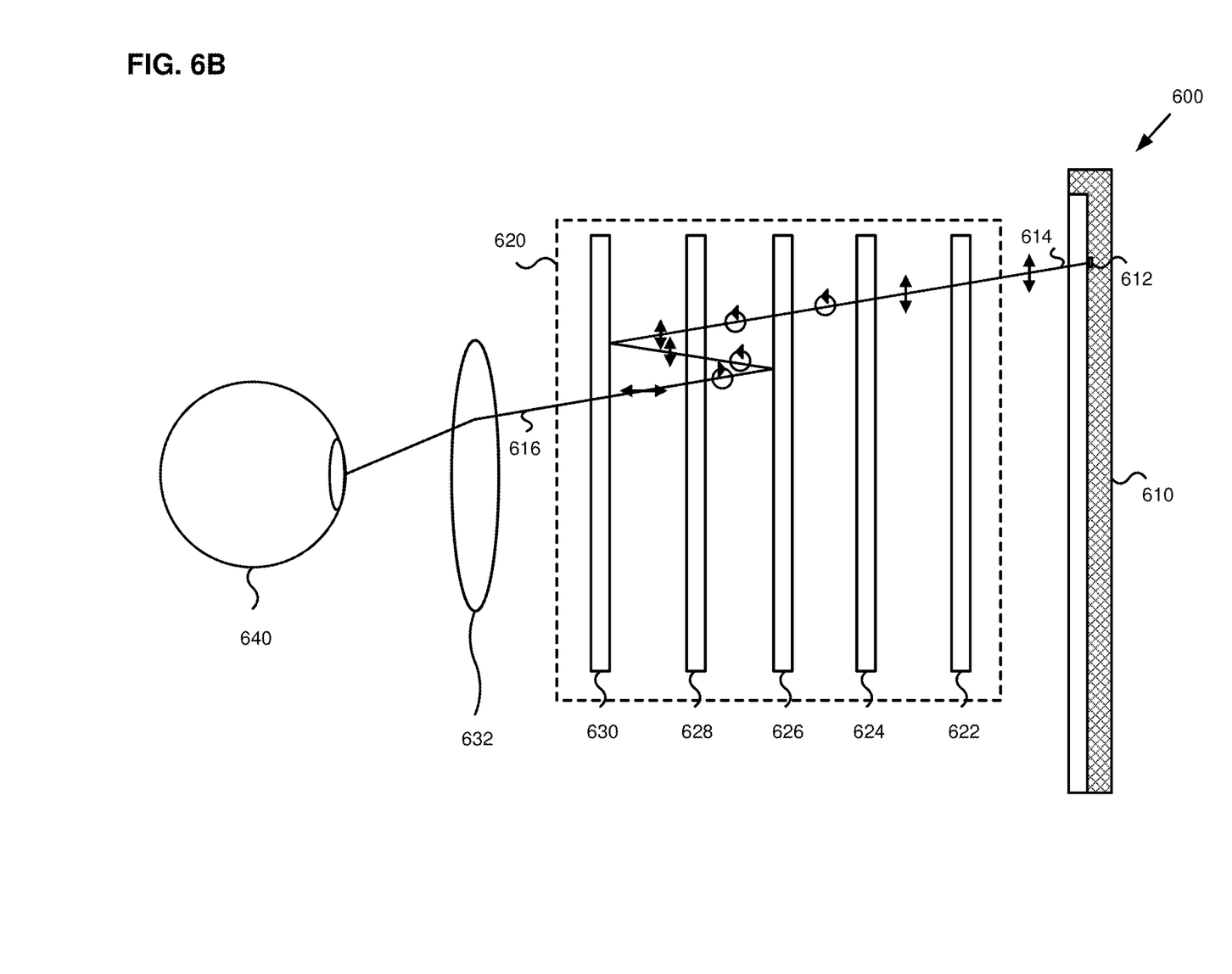
FIG. 6B illustrates a first light path traveling through the novel optical arrangement of FIG. 6A in accordance with an example implementation of the present disclosure.

FIG. 6B illustrates the first light path traveling through the novel optical arrangement of FIG. 6A in accordance with an example implementation of the present disclosure. As shown in FIG. 6B, the pixel 612 of the display medium 610 may emit linearly polarized light 614 in one or more directions. As the light 614 passes through the first polarization selective mirror 622, the first polarization selective mirror 622 selectively allows a particular polarization direction (e.g., vertical polarization or horizontal polarization) of the linearly polarized light 614 to pass through. As shown in FIG. 6B, in the present implementation, the light 614 emitted by the pixel 612 is vertically polarized. The first polarization selective mirror 622 selectively allows linearly polarized light in the vertical direction to pass through. Thus, 100% of the light 614 passes through the first polarization selective mirror 622.

The vertically linearly polarized light 614 then passes through the first retarder film 624, which converts the vertically linearly polarized light 614 to circularly polarized light. The circularly polarized light 614 then is incident on the half mirror 626. Half of the circularly polarized light 614 passes through the half mirror 626, thereby creating the first light path 616 with the handedness circular polarization unchanged. The other half of the circularly polarized light 614 is reflected by the half mirror 626, creating the second light path 618 as discussed below with reference to FIG. 6C. The circularly polarized light of the first light path 616 then passes through the second retarder film 628, which converts the circularly polarized light into linearly polarized light that has the same linear polarization direction (e.g., vertical polarization) as the light passing through the first polarization selective mirror 622.

The first retarder film 624 and the second retarder film 628 have their fast axes at 90° to each other, so that the light passing through both retarder films remain the same polarization direction as the incident light. In another implementation, the first retarder film 624 and the second retarder film 628 have their fast axes parallel to each other, in which case the light passing through both retarder films is at 90° to the linear polarization direction of the incident light.

After the second retarder film 628, the linearly polarized light of the first light path 616 is incident on the second polarization selective mirror 630. The second polarization selective mirror 630 reflects vertically polarized light and transmits horizontally polarized light. Since the linearly polarized light incident on the second polarization selective mirror 630 is vertically polarized, it is reflected by the second polarization selective mirror 630 back to the second retarder film 628. The reflected light of the first light path 616 travels through the second retarder film 628 again and becomes circularly polarized. The circularly polarized light is again reflected by the half mirror 626 toward the second retarder film 628. The half mirror 626 flips the handedness of the circularly polarized light from the second retarder film 628.

As the flipped circularly polarized light of the first light path 616 passes through the second retarder film 628, the flipped circularly polarized light is converted to linearly polarized light in a direction (e.g., horizontal direction) perpendicular to the linearly polarized light passing through the first polarization selective mirror 622. The horizontally linearly polarized light then passes through the second polarization selective mirror 630, and exits the optical arrangement 620 toward the lens 632.

Figure 6C:
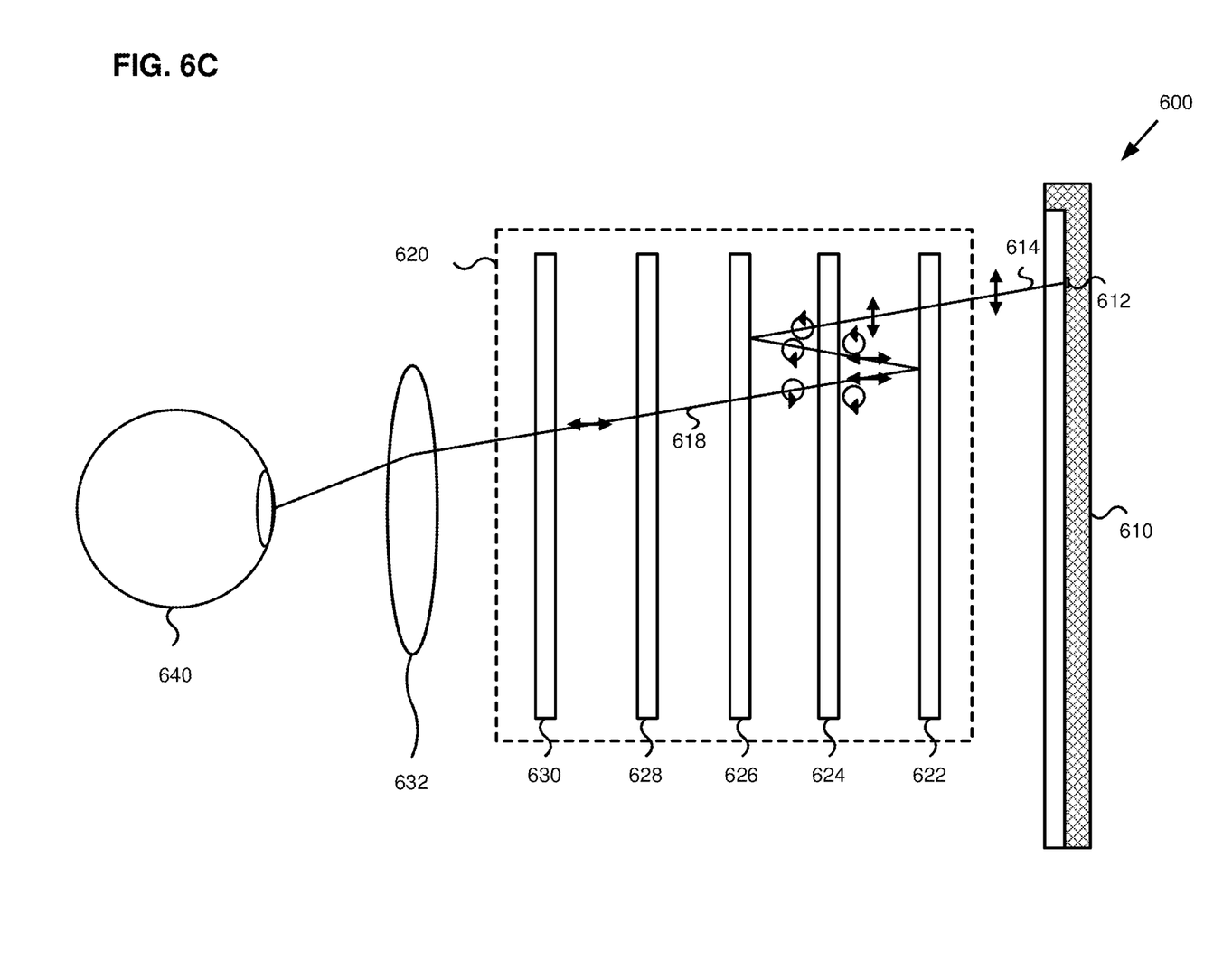
FIG. 6C illustrates a second light path traveling through the novel optical arrangement of FIG. 6A in accordance with an example implementation of the present disclosure.

FIG. 6C illustrates the second light path traveling through the novel optical arrangement of FIG. 6A in accordance with an example implementation of the present disclosure. As discussed above, the pixel 612 of the display medium 610 may emit linearly polarized light 614 in one or more directions. As the light 614 passes through the first polarization selective mirror 622, the first polarization selective mirror 622 selectively allows a particular polarization direction (e.g., vertical polarization or horizontal polarization) of the linearly polarized light 614 to pass through. As shown in FIG. 6C, in the present implementation, the light 614 emitted by the pixel 612 is vertically polarized. The first polarization selective mirror 622 selectively allows linearly polarized light in the vertical direction to pass through. Thus, 100% of the light 614 passes through the first polarization selective mirror 622.

The vertically linearly polarized light 614 then passes through the first retarder film 624, which converts the vertically linearly polarized light 614 to circularly polarized light. The circularly polarized light 614 then is incident on the half mirror 626. Half of the circularly polarized light 614 passes through the half mirror 626, thereby creating the first light path 616 with the handedness circular polarization unchanged. The other half of the circularly polarized light 614 is reflected by the half mirror 626, creating the second light path 618.

In the light path 618, the half mirror 626 flips the handedness of the circularly polarized light 614 as the circularly polarized light 614 is reflected by the half mirror 626. As the circularly polarized light 614 with flipped handedness passes through the first retarder film 624, the light becomes linearly polarized in the horizontal direction. The first polarization selective mirror 622 reflects the horizontally linearly polarized light back toward the first retarder film 624. The reflected horizontally linearly polarized light then passes through the first retarder film 624 and becomes circularly polarized again. The circularly polarized light from the first retarder film 624 passes through the half mirror 626 and the second retarder film 628 and becomes linearly polarized light again in the horizontal direction. The horizontally linearly polarized light then passes through the second polarization selective mirror 630, and exists the optical arrangement 620 toward the lens 632.

Figure 6D:
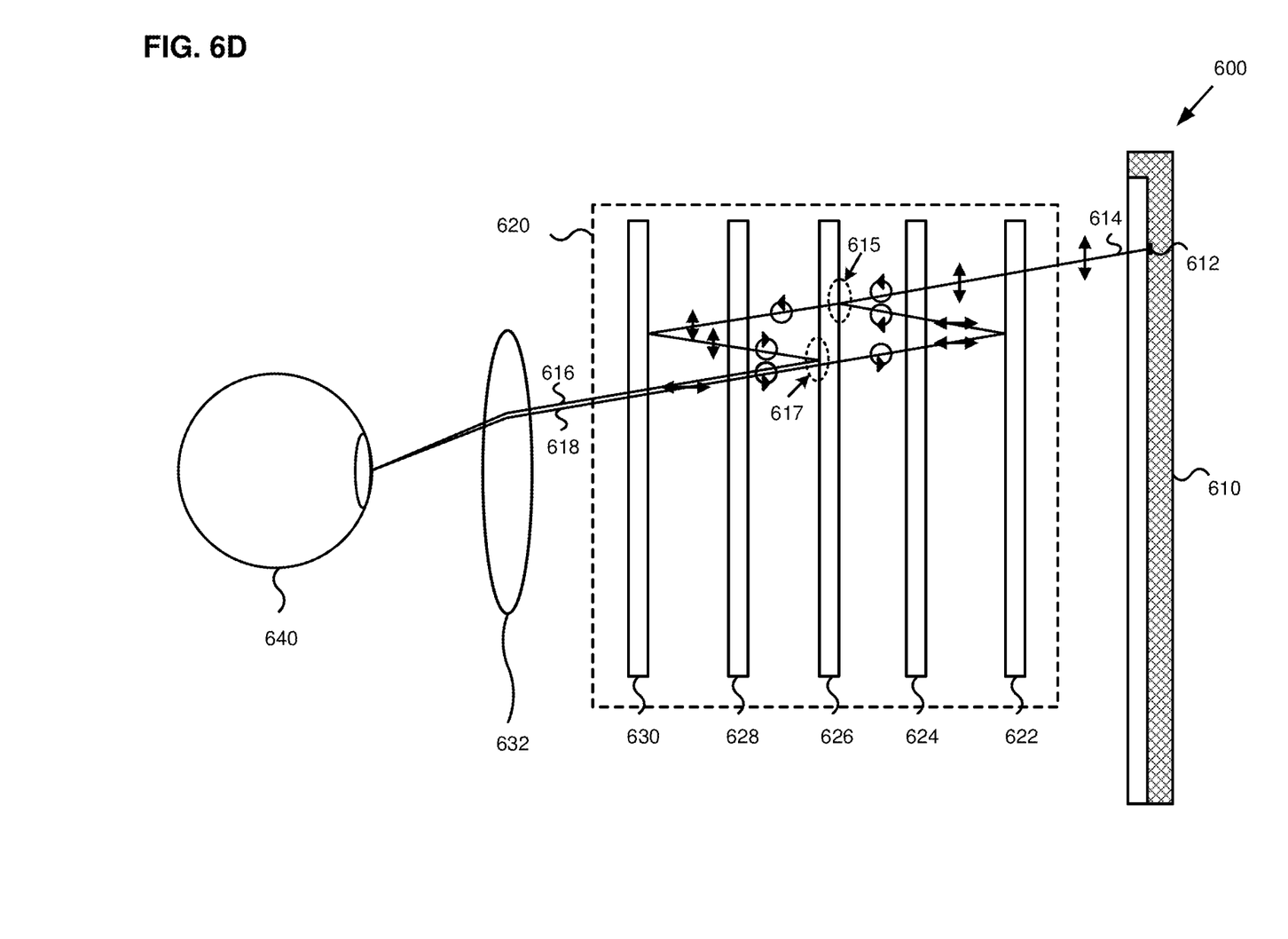
FIG. 6D shows the first and second light paths traveling through the novel optical arrangement of FIG. 6A in accordance with an example implementation of the present disclosure.

FIG. 6D shows the first and second light paths traveling through the novel optical arrangement of FIG. 6A in accordance with an example implementation of the present disclosure. As shown in FIG. 6D, the first light path 616 and the second light path 618 part ways at position 615 as the former passes through the half mirror 626 and the latter is reflected by the half mirror 626, and reunite with each other again at position 617 when the former is reflected by the half mirror 626 and the latter passes through the half mirror. As can be seen in FIG. 6D, after the first light path 616 and the second light path 618 are reunited again at the half mirror 626, the two light paths are substantially collinear as they exit the optical arrangement 620 toward the lens 632.

As shown in FIG. 6D, it is necessary to ensure that the light paths are aligned as well as increasing the light throughput of the device. Alignment of the light paths 616 and 618 is necessary since the user would otherwise see two images overlaid on each other with potentially different focus depths or distortions if this condition were not met, which would be unacceptable. However, it can be seen that the two light paths 616 and 618 have equal lengths and be collinear upon entering the lens 632 due to the symmetry of the two sections and planarity of the optics between the display medium 610 and the lens 632. It should be noted that, in FIG. 6D, the light paths 616 and 618 are shown slightly separated only for clarity but would not actually be separated.

Figure 6E:
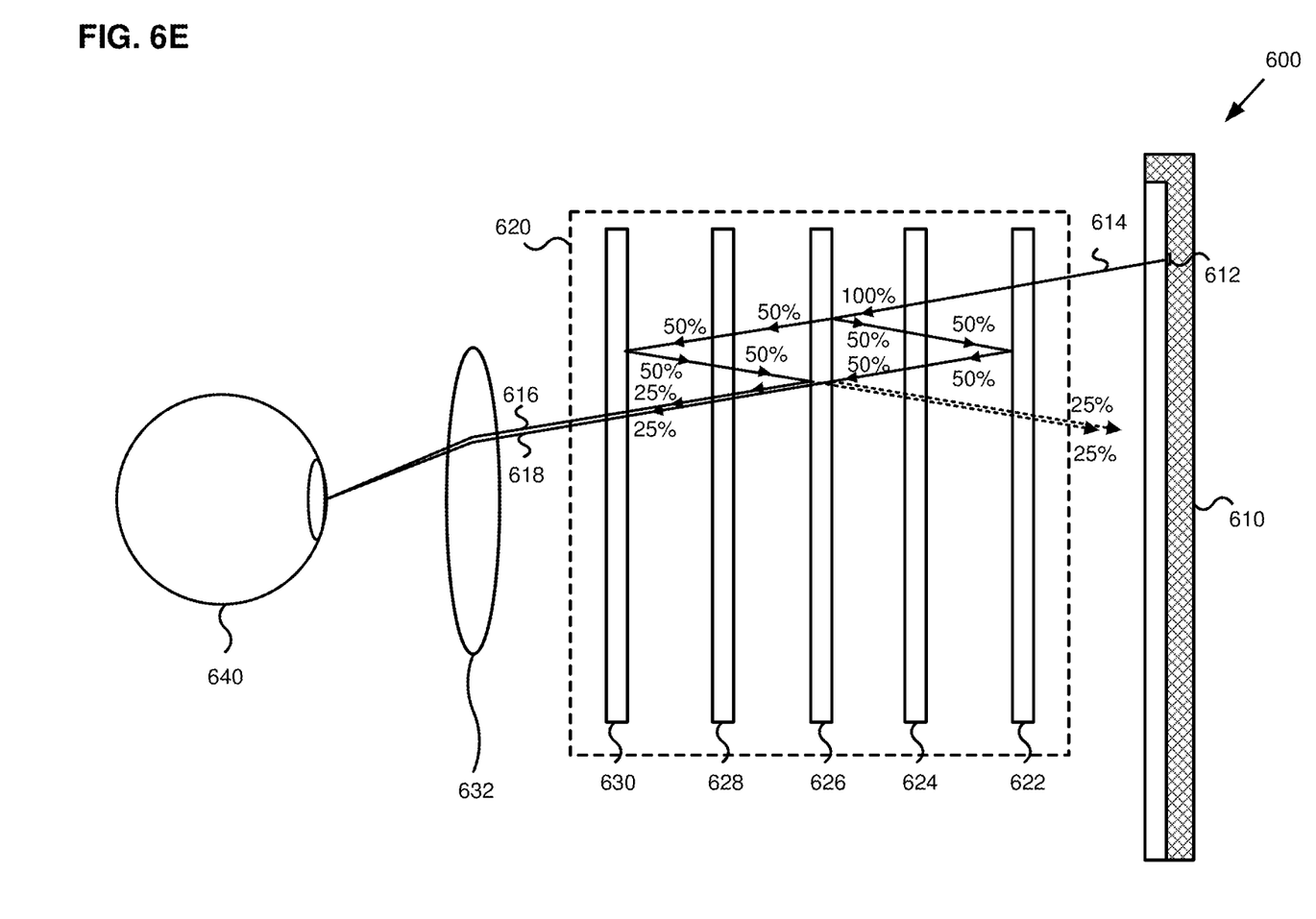
FIG. 6E illustrates the novel optical arrangement having high-efficiency pancake optics for the HMD of FIG. 6A with losses due to the various components of the folded optical path sections shown in accordance with an example implementation of the present disclosure.

FIG. 6E illustrates the novel optical arrangement having high-efficiency pancake optics for the HMD of FIG. 6A with losses due to the various components of the folded optical path sections shown in accordance with an example implementation of the present disclosure. FIG. 6E illustrates light throughput in the HMD 600 in detail. In FIG. 6E, the light 614 emitted by the display medium 610 is linearly polarized and then first passes through the first polarization selective mirror 622, which is configured in such a way that 100% of the linearly polarized light 614 is transmitted through the first polarization selective mirror 622, and then passes through the first retarder film 624. The light 614 is incident on the half mirror which transmits 50% of light 614 in light path 616 and reflects the other 50% of the light 614 in the light path 618.

The light path 616 is reflected back from the second polarization selective mirror 630 through the second retarder film 628. When the light path 616 is incident on the half mirror 626 again, half of the light path 616 (25% of light 614) is transmitted through the half mirror 626 toward the first polarization selective mirror 622, and the other half of the light path 616 (25% of light 614) is reflected toward the second polarization selective mirror 630.

The light path 618 is reflected back from the first polarization selective mirror 622 through the first retarder film 624. When the light path 618 is incident on the half mirror 626, half of the light path 618 (25% of light 614) is transmitted through the half mirror 626 toward the second polarization selective mirror 630, and the other half of the light path 618 (25% of light 614) is reflected toward the first polarization selective mirror 622.

As shown in FIG. 6E, the symmetry of the two folded optical path sections where the light is folded is such that the brightness efficiency of each of the two folded optical path section is the same such that as much as 25% of the light also has a folded optical path between the half mirror 626 and the second polarization selective mirror 630. As shown in FIG. 6E, the tracking of light losses through the optical arrangement 620 reveals that a maximum of 50% brightness efficiency is achievable for each of the respective light paths.

Figure 7:
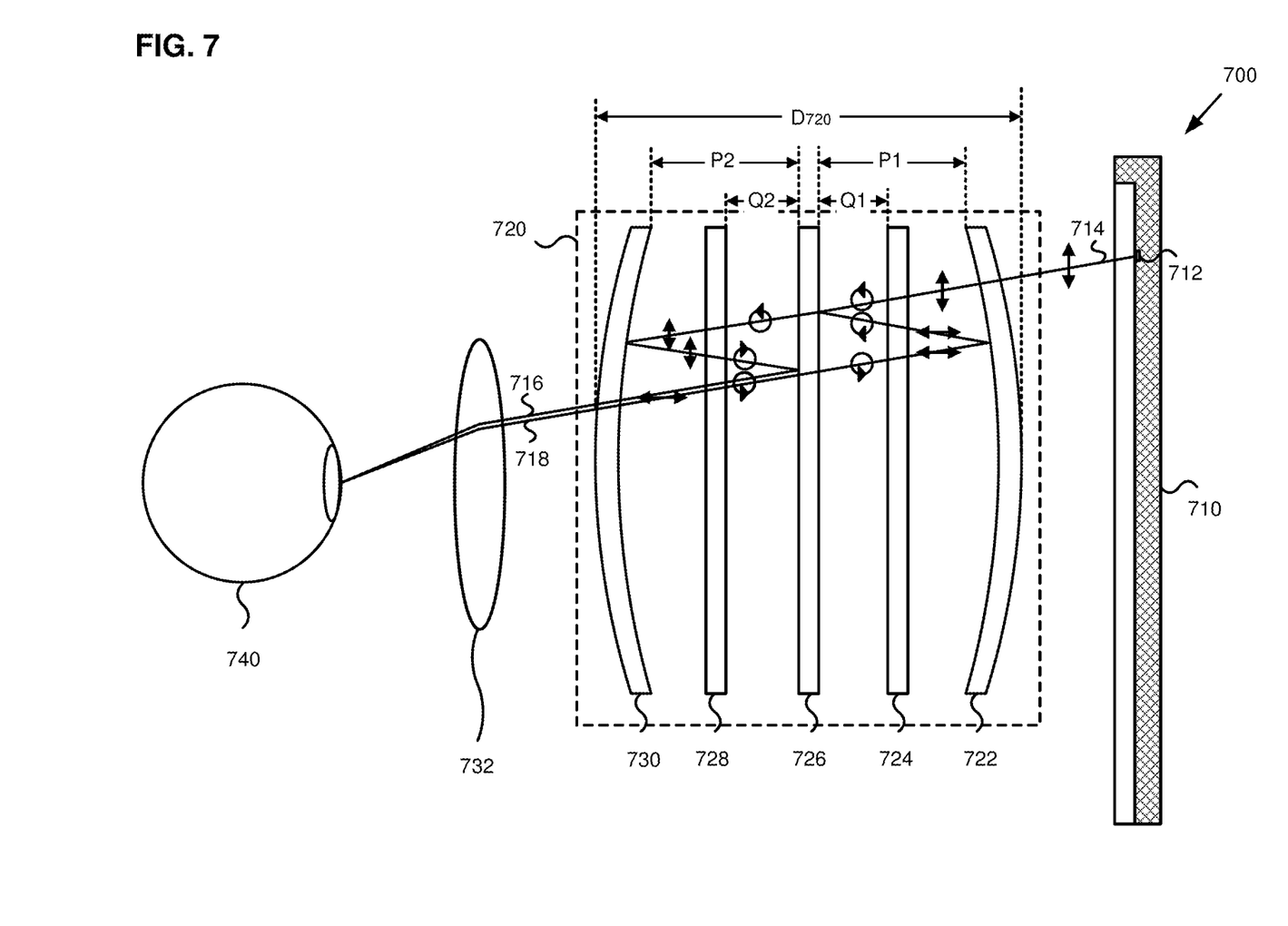
FIG. 7 illustrates another novel optical arrangement having high-efficiency pancake optics for an HMD in accordance with an example implementation of the present disclosure.

FIG. 7 illustrates another novel optical arrangement having high-efficiency pancake optics for an HMD in accordance with another example implementation of the present disclosure. As shown in FIG. 7, an HMD 700 includes a display medium 710 and an optical arrangement 720 that is configured to provide at least two light paths for light emitted from each of a plurality of pixels of the display medium 710. In the present implementation, the HMD 700 also includes a lens 732 to collimate the light from the optical arrangement 720 before reaching a user's eye 740.

The display medium 710 may substantially correspond to the display medium 610 in FIGS. 6A-6E. The display medium 710 may include a plurality of pixels configured to emit light and collectively generating imagery. For example, a pixel 712 of the display medium 710 may emit light 714. As the emitted light 714 travels through the optical arrangement 720, two light paths 716 and 718 are created. The two light paths 716 and 718 are substantially collinear when exiting the optical arrangement 720. It should be noted that, in FIG. 7, the light paths 716 and 718 are shown slightly separated only for clarity but would not actually be separated.

The optical arrangement 720 includes a first polarization selective mirror 722, a first retarder film 724 (e.g., a quarter-wave plate), a half mirror 726, a second retarder film 728 (e.g., a quarter-wave plate), and a second polarization selective mirror 730, where the first retarder film 724, the half mirror 726, and the second retarder film 728 may substantially correspond to the first retarder film 624, the half mirror 626, and the second retarder film 628, respectively, in FIGS. 6A-6E.

In the optical arrangement 720, the first polarization selective mirror 722 allows linearly polarized light in a first polarization direction to pass through, while the second polarization selective mirror 730 allows linearly polarized light in a second polarization direction, orthogonal to the first polarization direction, to pass through. The first polarization selective mirror 722 and the second polarization selective mirror 730 are curved to further reduce the size of the optical arrangement 720.

In the present implementation, the first polarization selective mirror 722 and the second polarization selective mirror 730 are disposed symmetrically on opposite sides of the half mirror 726. As shown in FIG. 7, the distance (P1) between the first polarization selective mirror 722 and the half mirror 726 is equal to the distance (P2) between the second polarization selective mirror 730 and the half mirror 726. Also, the first retarder film 724 and the second retarder film 728 are disposed symmetrically on opposite sides of the half mirror 726. However, the first retarder film 724 and the second retarder film 728 need not be disposed symmetrically and may be disposed asymmetrically. As shown in FIG. 7, the distance (Q1) between the first retarder film 724 and the half mirror 726 is equal to the distance (Q2) between the second retarder film 728 and the half mirror 726. Also, the first polarization selective mirror 722 and the second polarization selective mirror 730 have the same curvature with respect to the half mirror. Symmetry of the two folded optical path sections ensures the light paths 716 and 718 are still collinear when transmitted through the second polarization selective mirror 730. Similar to the optical arrangement 620 in FIGS. 6A-6E, the tracking of light losses through the optical arrangement 720 reveals that a maximum of 50% brightness efficiency is achievable for each of the respective light paths.

As a result of using the curved polarization selective mirrors, the distance $D_{720}$ between the two polarization selective mirrors in FIG. 7 can be reduced as compared to the distance $D_{620}$ between the two polarization selective mirrors in FIG. 6A. In the present implementation, the distance $D_{720}$ between the two polarization selective mirrors 722 and 730 may be between ½ and ⅔ of that of the typical lens to display distance in a conventional system. In one implementation, the distance $D_{720}$ between the two polarization selective mirrors 722 and 730 may be 20-25 mm. In other implementation, the distance $D_{720}$ between the two polarization selective mirrors 722 and 730 may be greater or smaller than 20-25 mm.

Figure 8:
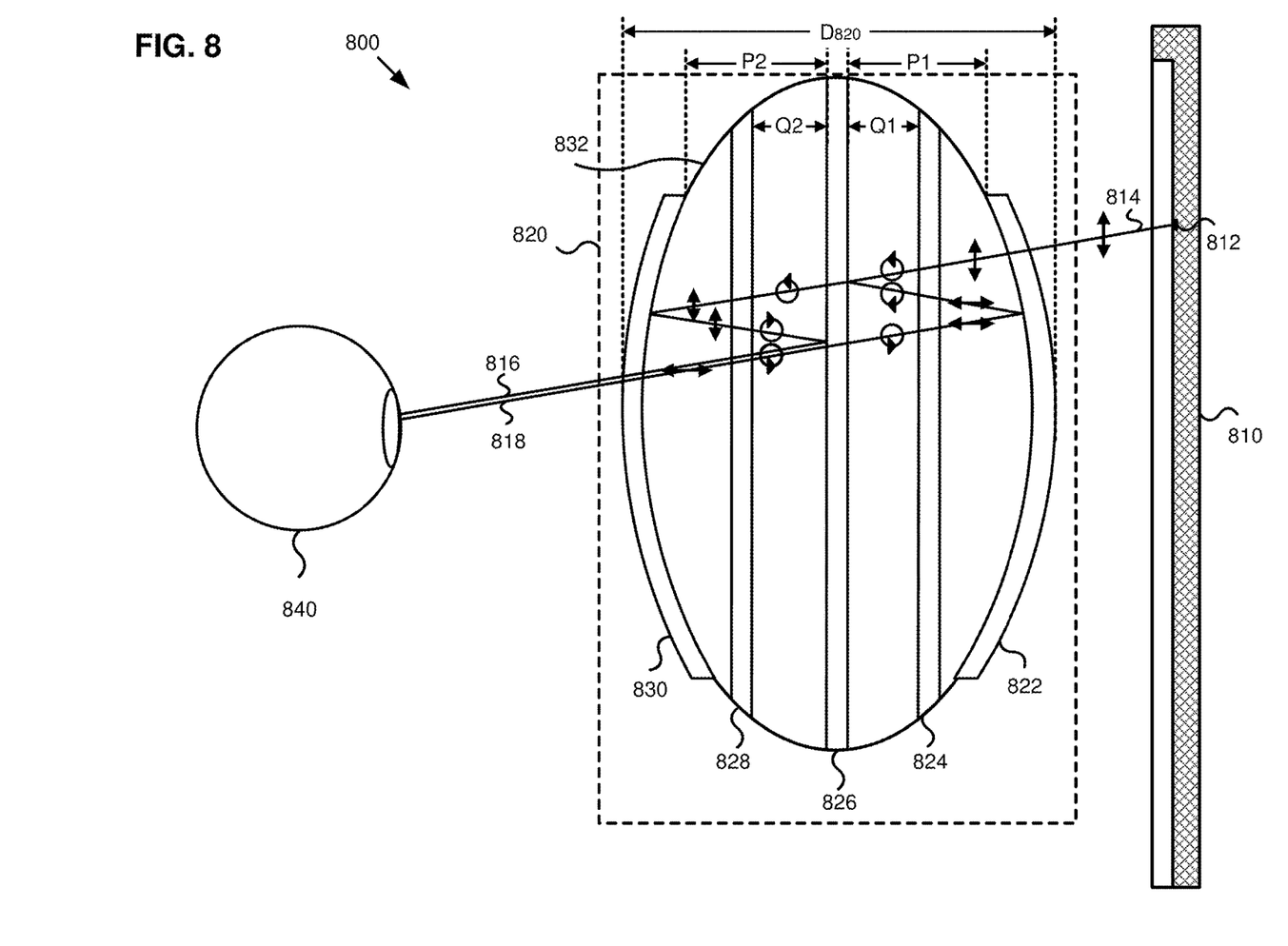
FIG. 8 illustrates another novel optical arrangement having high-efficiency pancake optics for an HMD in accordance with an example implementation of the present disclosure.

FIG. 8 illustrates another novel optical arrangement having high-efficiency pancake optics for an HMD in accordance with another implementation of the present disclosure. As shown in FIG. 8, an HMD 800 includes a display medium 810 and an optical arrangement 820 that is configured to provide at least two light paths for light emitted from each of a plurality of pixels of the display medium 810.

The display medium 810 may substantially correspond to the display medium 610 in FIGS. 6A-6E. The display medium 810 may include a plurality of pixels configured to emit light and collectively generating imagery. For example, a pixel 812 of the display medium 810 may emit light 814. As the emitted light 814 travels through the optical arrangement 820, two light paths 816 and 818 are created. The two light paths 816 and 818 are substantially collinear when exiting the optical arrangement 820. It should be noted that, in FIG. 8, the light paths 816 and 818 are shown slightly separated only for clarity but would not actually be separated.

The optical arrangement 820 includes a first polarization selective mirror 822, a first retarder film 824 (e.g., a quarter-wave plate), a half mirror 826, a second retarder film 828 (e.g., a quarter-wave plate), and a second polarization selective mirror 830, which may substantially correspond to first polarization selective mirror 722, the first retarder film 724, the half mirror 726, the second retarder film 728, and the second polarization selective mirror 730, respectively, in FIG. 7. In the present implementation, the optical arrangement 820 is integrated in a lens 832.

As shown in FIG. 8, the first polarization selective mirror 822 and second polarization selective mirror 830 are formed on or adhered to the surface of the lens 832 in order to preserve the refracting power of the lens 832 while still reducing the size that the lens 832 occupies. In some implementations, the lens 832 may include multiple sections with the half mirror 826, the first retarder film 824 and the second retarder film 828 placed between the sections before optical matching fluid is used to fuse the parts into a single section.

In the present implementation, the first polarization selective mirror 822 and the second polarization selective mirror 830 are disposed symmetrically on opposite sides of the half mirror 826. As shown in FIG. 8, the distance (P1) between the first polarization selective mirror 822 and the half mirror 826 is equal to the distance (P2) between the second polarization selective mirror 830 and the half mirror 826. Also, the first retarder film 824 and the second retarder film 828 are disposed symmetrically on opposite sides of the half mirror 826. However, the first retarder film 824 and the second retarder film 828 need not be disposed symmetrically and may be disposed asymmetrically. As shown in FIG. 8, the distance (Q1) between the first retarder film 824 and the half mirror 826 is equal to the distance (Q2) between the second retarder film 828 and the half mirror 826. Also, the first polarization selective mirror 822 and the second polarization selective mirror 830 have the same curvature with respect to the half mirror. Symmetry of the two folded optical path sections ensures the light paths 816 and 818 are still collinear when transmitted through the second polarization selective mirror 830. Similar to the optical arrangement 620 in FIGS. 6A-6E, the tracking of light losses through the optical arrangement 820 reveals that a maximum of 50% brightness efficiency is achievable for each of the respective light paths.

As a result of using the curved polarization selective mirrors, the distance $D_{820}$ between the two polarization selective mirrors in FIG. 8 can be reduced as compare to the distance $D_{620}$ between the two polarization selective mirrors in FIG. 6A. In the present implementation, the distance $D_{820}$ between the two polarization selective mirrors 822 and 830 may be between ½ and ⅔ of that of the typical lens to display distance in a conventional system. In one implementation, the distance $D_{820}$ between the two polarization selective mirrors 822 and 830 may be 20-25 mm. In other implementation, the distance $D_{820}$ between the two polarization selective mirrors 822 and 830 may be greater or smaller than 20-25 mm. In addition, since the optical arrangement 820 is integrated with the lens 832, an additional lens is not required to collimate the light before reaching a user's eye 840.

Figure 9:
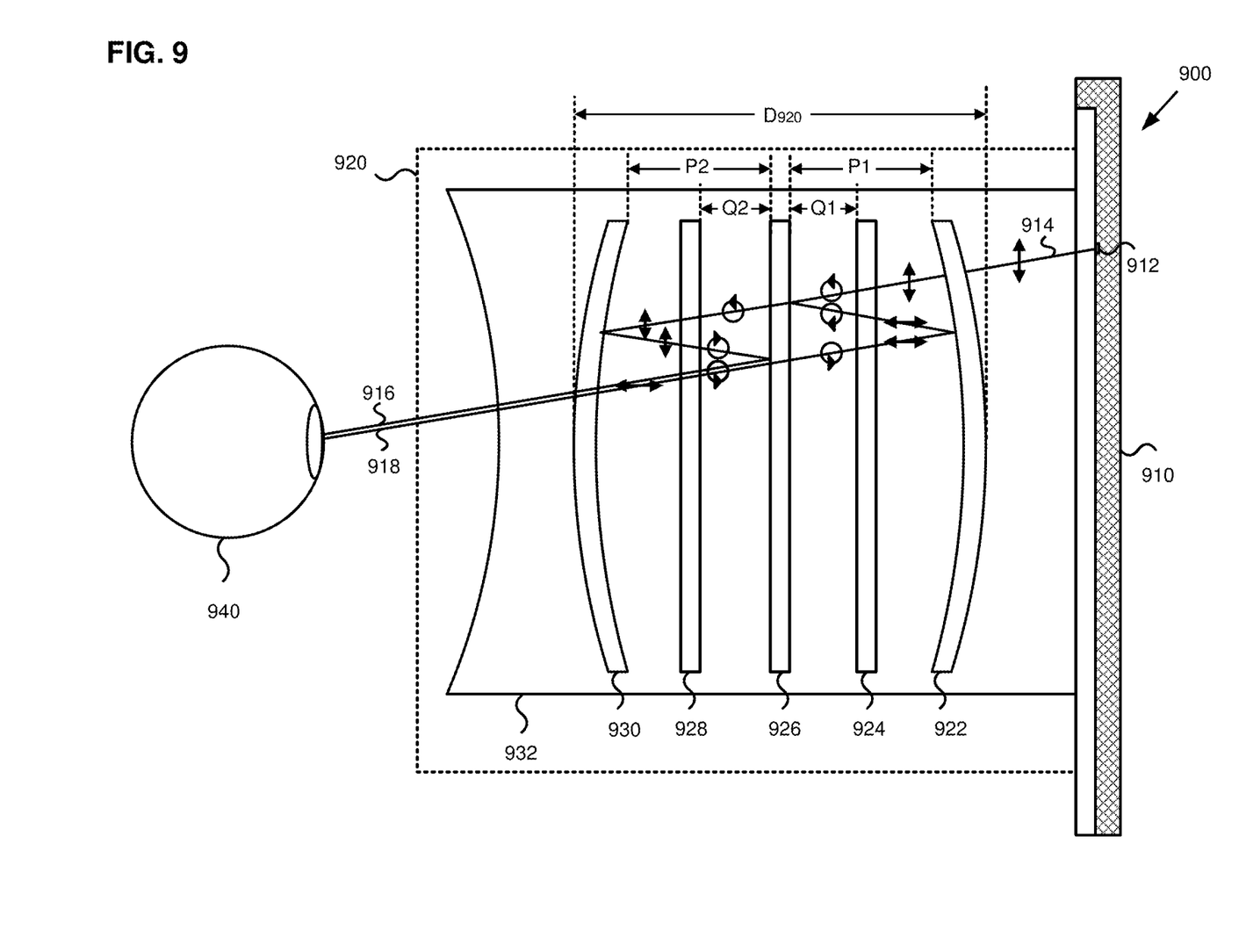
FIG. 9 illustrates another novel optical arrangement having high-efficiency pancake optics for an HMD in accordance with an example implementation of the present disclosure.

FIG. 9 illustrates another novel optical arrangement having high-efficiency pancake optics for an HMD in accordance with another example implementation of the present disclosure. As shown in FIG. 9, an HMD 900 includes a display medium 910 and an optical arrangement 920 that is configured to provide at least two light paths for light emitted from each of a plurality of pixels of the display medium 910.

The display medium 910 may substantially correspond to the display medium 610 in FIGS. 6A-6E. The display medium 910 may include a plurality of pixels configured to emit light and collectively generating imagery. For example, a pixel 912 of the display medium 910 may emit light 914. As the emitted light 914 travels through the optical arrangement 920, two light paths 916 and 918 are created. The two light paths 916 and 918 are substantially collinear when exiting the optical arrangement 920. It should be noted that, in FIG. 9, the light paths 916 and 918 are shown slightly separated only for clarity but would not actually be separated.

The optical arrangement 920 includes a first polarization selective mirror 922, a first retarder film 924 (e.g., a quarter-wave plate), a half mirror 926, a second retarder film 928 (e.g., a quarter-wave plate), and a second polarization selective mirror 930, which may substantially correspond to first polarization selective mirror 722, the first retarder film 724, the half mirror 726, the second retarder film 728, and the second polarization selective mirror 730, respectively, in FIG. 7.

In the optical arrangement 920, the first polarization selective mirror 922 allows linearly polarized light in a first polarization direction to pass through, while the second polarization selective mirror 930 allows linearly polarized light in a second polarization direction, orthogonal to the first polarization direction, to pass through. The first polarization selective mirror 922 and the second polarization selective mirror 930 are curved to further reduce the size of the optical arrangement 920.

In the present implementation, the first polarization selective mirror 922 and the second polarization selective mirror 930 are disposed symmetrically on opposite sides of the half mirror 926. As shown in FIG. 9, the distance (P1) between the first polarization selective mirror 922 and the half mirror 926 is equal to the distance (P2) between the second polarization selective mirror 930 and the half mirror 926. Also, the first retarder film 924 and the second retarder film 928 are disposed symmetrically on opposite sides of the half mirror 926. However, the first retarder film 924 and the second retarder film 928 need not be disposed symmetrically and may be disposed asymmetrically. As shown in FIG. 9, the distance (Q1) between the first retarder film 924 and the half mirror 926 is equal to the distance (Q2) between the second retarder film 928 and the half mirror 926. Also, the first polarization selective mirror 922 and the second polarization selective mirror 930 have the same curvature with respect to the half mirror. Symmetry of the two folded optical path sections ensures the light paths 916 and 918 are still collinear when transmitted through the second polarization selective mirror 930. Similar to the optical arrangement 620 in FIGS. 6A-6E, the tracking of light losses through the optical arrangement 920 reveals that a maximum of 50% brightness efficiency is achievable for each of the respective light paths.

As a result of using the curved polarization selective mirrors, the distance $D_{920}$ between the two polarization selective mirrors in FIG. 9 can be reduced as compare to the distance $D_{620}$ between the two polarization selective mirrors in FIG. 6A. In the present implementation, the distance $D_{920}$ between the two polarization selective mirrors 922 and 930 may be between ½ and ⅔ of that of the typical lens to display distance in a conventional system. In one implementation, the distance $D_{920}$ between the two polarization selective mirrors 922 and 930 may be 20-25 mm. In other implementation, the distance $D_{920}$ between the two polarization selective mirrors 922 and 930 may be greater or smaller than 20-25 mm.

As shown in FIG. 9, the optical arrangement 920 utilizes the focusing power of the curved mirror surfaces in order to reduce lateral chromatic aberrations. As shown in FIG. 9, a refracting medium 932 provides support for the two folded optical path sections and an exit surface of the light transmission through the second polarization selective mirror 930 such that absorption in a user's retina is concentric to the eye 940 in order to ensure that different wavelengths of the transmitted light are not laterally separated.

As the present disclosure may be embodied in several forms without departing from the spirit or essential characteristics thereof, it should also be understood that the disclosed implementations are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are therefore intended to be embraced by the appended claims.

The foregoing implementations and advantages are merely example and are not to be construed as limiting the present disclosure. The present teaching can be readily applied to other types of apparatuses. The description of the

What is claimed is:

1. A head mounted display (HMD) comprising:
a display medium having a plurality of pixels and configured to emit light from at least one of the plurality of pixels; and
an optical arrangement providing at least two light paths for the emitted light,
wherein the optical arrangement comprises:
a first polarization selective mirror configured to transmit a first polarization component of the emitted light;
a second polarization selective mirror configured to transmit a second polarization component of the emitted light; and
a partial mirror between the first polarization selective mirror and the second polarization selective mirror, wherein the first polarization selective mirror and the second polarization selective mirror are each curved such that the at least two light paths are substantially collinear when exiting the optical arrangement.

2. The HMD of claim 1, further comprising a lens, wherein the optical arrangement is between the display medium and the lens.

3. The HMD of claim 1, further comprising a lens, wherein at least one of the first polarization selective mirror, the second polarization selective mirror, and the partial mirror is either integrated in the lens or adhered to a surface of the lens.

4. The HMD of claim 1, further comprising:
a first retarder film between the first polarization selective mirror and the partial mirror; and
a second retarder film between the partial mirror and the second polarization selective mirror.

5. The HMD of claim 4, wherein:
the partial mirror is a half mirror;
the first retarder film is a first quarter wave plate; and
the second retarder film is a second quarter wave plate.

6. The HMD of claim 4, wherein the first retarder film and the second retarder film are arranged symmetrically with respect to the partial mirror.

7. The HMD of claim 1, wherein the first polarization selective mirror and the second polarization selective mirror are arranged symmetrically with respect to the partial mirror.

8. The HMD of claim 1, wherein the first polarization component is orthogonal to the second polarization component.

9. The HMD of claim 1, wherein the at least two light paths are substantially collinear when exiting the optical arrangement.

10. The HMD of claim 1, wherein the emitted light is linearly polarized having the first polarization component.

11. The HMD of claim 1, further comprising a refracting medium that supports the optical arrangement such that different wavelengths of the emitted light are not laterally separated.

12. A head mounted display (HMD) comprising:
a display medium having a plurality of pixels and configured to emit light from at least one of a plurality of pixels; and
an optical arrangement providing at least two light paths for the emitted light,
wherein the optical arrangement comprises:
a first linear polarization selective mirror configured to transmit a first polarization component of the light;
a second linear polarization selective mirror configured to transmit a second polarization component of the light;
a half mirror between the first linear polarization selective mirror and the second linear polarization selective mirror;
a first quarter wave plate between the first linear polarization selective mirror and the half mirror; and
a second quarter wave plate between the half mirror and the second linear polarization selective mirror, wherein the first linear polarization selective mirror and the second linear polarization selective mirror are each curved such that the at least two light paths are substantially collinear when exiting the optical arrangement.

13. The HMD of claim 12, further comprising a lens, wherein the optical arrangement is between the display medium and the lens.

14. The HMD of claim 12, further comprising a lens, wherein at least one of the first linear polarization selective mirror, the second linear polarization selective mirror, the half mirror, the first quarter wave plate, and the second quarter wave plate is either integrated in the lens or adhered to a surface of the lens.

15. The HMD of claim 12, wherein:
the first linear polarization selective mirror and the second linear polarization selective mirror are arranged symmetrically with respect to the half mirror; and
the first quarter wave plate and the second quarter wave plate are arranged symmetrically with respect to the half mirror.

16. The HMD of claim 12, wherein the at least two light paths are substantially collinear when exiting the optical arrangement.

17. The HMD of claim 12, wherein:
the emitted light is linearly polarized having the first polarization component; and
the first polarization component is orthogonal to the second polarization component.

18. The HMD of claim 12, further comprising a refracting medium that supports the optical arrangement such that different wavelengths of the emitted light are not laterally separated.

* * * * *